US009847699B2

(12) United States Patent
Takamura et al.

(10) Patent No.: US 9,847,699 B2
(45) Date of Patent: Dec. 19, 2017

(54) ELECTRIC MOTOR

(71) Applicants: Mitsuba Corporation, Gunma (JP); WEBASTO SE, Stockdorf (DE)

(72) Inventors: Yuichi Takamura, Gunma (JP); Werner Lissner, Starnberg (DE); Franz Fersch, Gauting (DE); Bernhard Meier, Kirchheim (DE)

(73) Assignees: Mitsuba Corporation, Kiryu-shi, Gunma (JP); Webasto SE, Stockdorf (DE)

( * ) Notice: Subject to any disclaimer, the term of this patent is extended or adjusted under 35 U.S.C. 154(b) by 228 days.

(21) Appl. No.: 14/650,386

(22) PCT Filed: Sep. 6, 2013

(86) PCT No.: PCT/JP2013/074024
§ 371 (c)(1),
(2) Date: Jun. 8, 2015

(87) PCT Pub. No.: WO2015/033430
PCT Pub. Date: Mar. 12, 2015

(65) Prior Publication Data
US 2015/0326096 A1    Nov. 12, 2015

(51) Int. Cl.
*H02K 11/00* (2016.01)
*H02K 7/116* (2006.01)
(Continued)

(52) U.S. Cl.
CPC ....... *H02K 11/0005* (2013.01); *H02K 7/1166* (2013.01); *H02K 11/01* (2016.01); *H02K 11/40* (2016.01)

(58) Field of Classification Search
CPC ............. H02K 7/1166; H02K 11/0005; H02K 11/0089; H02K 11/01; H02K 11/40; H02K 7/116
See application file for complete search history.

(56) References Cited

U.S. PATENT DOCUMENTS

| 5,872,411 A * | 2/1999 | Nakata ................... H02K 5/225 |
| | | 310/67 R |
| 2006/0181166 A1 | 8/2006 | Saito et al. |

(Continued)

FOREIGN PATENT DOCUMENTS

| JP | 2010-57299 A | 3/2010 |
| WO | 2004068679 A1 | 8/2004 |

OTHER PUBLICATIONS

Translation of JP2010-57299, Mar. 11, 2010.*
International Search Report for PCT/JP2013/074024 dated Sep. 30, 2013.

*Primary Examiner* — Bernard Rojas
(74) *Attorney, Agent, or Firm* — McCormick, Paulding & Huber LLP

(57) ABSTRACT

A metal gear cover 43, which is provided so as to cover a worm wheel housing 36b, is disposed between a worm wheel 41d and a circuit board 51 and grounded, thereby quickly introducing exogenous noise "ON" such as static electricity to the outside of the sunroof motor 21, even if exogenous noise "ON" enters the sunroof motor 21 and reaches the gear cover 43. Therefore, it is possible to surely prevent exogenous noise "ON" from being reflected to the circuit board 51, and causing the circuit board 51 to malfunction and the like. Furthermore, it is possible to improve reliability of the sunroof motor 21.

2 Claims, 5 Drawing Sheets

(51) Int. Cl.
   *H02K 11/01*     (2016.01)
   *H02K 11/40*     (2016.01)

(56)         References Cited

U.S. PATENT DOCUMENTS

2007/0164621 A1* 7/2007 Kano .................... H02K 5/225
                                                       310/71
2009/0183940 A1* 7/2009 Sekine ................ B62D 5/0406
                                                      180/443
2017/0047817 A1* 2/2017 Tanaka .................... H02K 5/18

* cited by examiner

ELECTRIC MOTOR

CROSS REFERENCE TO RELATED APPLICATION

Applicant hereby claims foreign priority benefits under U.S.C. §119 from International Patent Application Serial No. PCT/JP2013/074024 filed on Sep. 6, 2013, the content of which is incorporated by reference herein.

TECHNICAL FIELD

The present invention relates to an electric motor including a yoke in which a rotation axis is housed, and a casing in which a reduction mechanism and a circuit board are housed.

BACKGROUND ART

Conventionally, an electric motor provided with a speed reduction mechanism is used in many cases as a driving source for a sunroof apparatus, etc. Such an electric motor used in the sunroof apparatus, etc., includes: a yoke in which an armature spindle (rotating shaft) is rotatably housed; and a gear case (casing) which is connected to an open end of the yoke and in which a speed reduction mechanism for reducing the rotation speed of the armature spindle is housed. A mechanism including: a worm which is rotated by the armature spindle; and a worm wheel having gear teeth which is engaged with the worm are used as the speed reduction mechanism, thereby producing a relatively large power in spite of its compact structure.

Additionally, when opening and closing a sunroof which is an openable and closable element, it is necessary for the electric motor used in the sunroof apparatus, etc., to detect the opening and closing movement of the sunroof, and to control the rotation of the armature spindle. Therefore, a control board (circuit board) is provided so as to meet this requirement. The control board, together with the speed reduction mechanism, is housed in the gear case, and is protected from being exposed to rainwater, dust, etc. Furthermore, a gear cover (cover member) is provided between the speed reduction mechanism and the control board, thereby preventing lubricating oil, such as grease, applied to the speed reduction mechanism from scattering toward the control board.

Such an electric motor having a gear cover provided between a speed reduction mechanism and a control board is described in, for example, Japanese Patent Application Laid-Open Publication No. 2010-57299 (FIG. 3), and known as prior art. According to the electric motor described in Japanese Patent Application Laid-Open Publication No. 2010-57299 (FIG. 3), the gear cover is made from a steel plate by press working, etc., and a plurality of fitting claws integrally provided on the periphery of the gear cover are inserted in respective fitting holes of a resin gear case, so that the gear cover is fixed firmly to the gear case, and prevented from rattling.

SUMMARY

In the electric motor disclosed in the Japanese Patent Application Laid-Open Publication No. 2010-57299 (FIG. 3), when exogenous noise, such as static electricity, enters a fixed part, such as install leg, of the electric motor fixed to a vehicle body, and proceeds to the interior of the electric motor, exogenous noise may be reflected on the metal cover member, and then reach various parts (unspecific parts) of the circuit board. For this reason, it is necessary to prevent malfunctioning, etc. of the circuit board, and to prevent exogenous noise reaching the cover member from being reflected to the circuit board.

An object of the present invention is to provide an electric motor which can prevent exogenous noise reaching a cover member from being reflected to various parts of a circuit board, thereby further improving reliability of the electric motor.

An electric motor according one aspect of the present invention comprises: a yoke in which a rotating shaft is housed; a casing connected to the yoke; a speed reduction mechanism housing unit provided in the casing, wherein a speed reduction mechanism for reducing a rotation speed of the rotating shaft is housed in the speed reduction mechanism housing unit; a board housing unit provided in the casing, and a circuit board for controlling a rotation of the rotating shaft; and a metal cover member provided so as to cover the speed reduction mechanism housing unit, wherein the grounded cover member is provided between the speed reduction mechanism and the circuit board.

In another aspect to the present invention, a metal contact plate having a connection terminal is provided between the yoke and the casing, and the connection terminal is connected to the cover member.

In still another aspect to the present invention, the casing has a fitting hole, the cover member has a fitting claw which is fitted in the fitting hole of the case, and the communication terminal is connected to the fitting claw.

According to the present invention, a grounded metal cover member provided so as to cover a speed reduction mechanism housing unit is provided between a speed reduction mechanism and a circuit board. In this configuration, even if exogenous noise, such as static electricity, enters an electric motor and reaches the cover member, exogenous noise is quickly introduced to the outside of the electric motor. Therefore, it is possible to surely prevent exogenous noise from being reflected to the circuit board and causing the circuit board to malfunction and the like, thereby improving reliability of the sunroof motor 21.

DETAILED DESCRIPTION

Hereinafter, one embodiment of the present invention will be described in detail with reference to the drawings.

Figure 1:
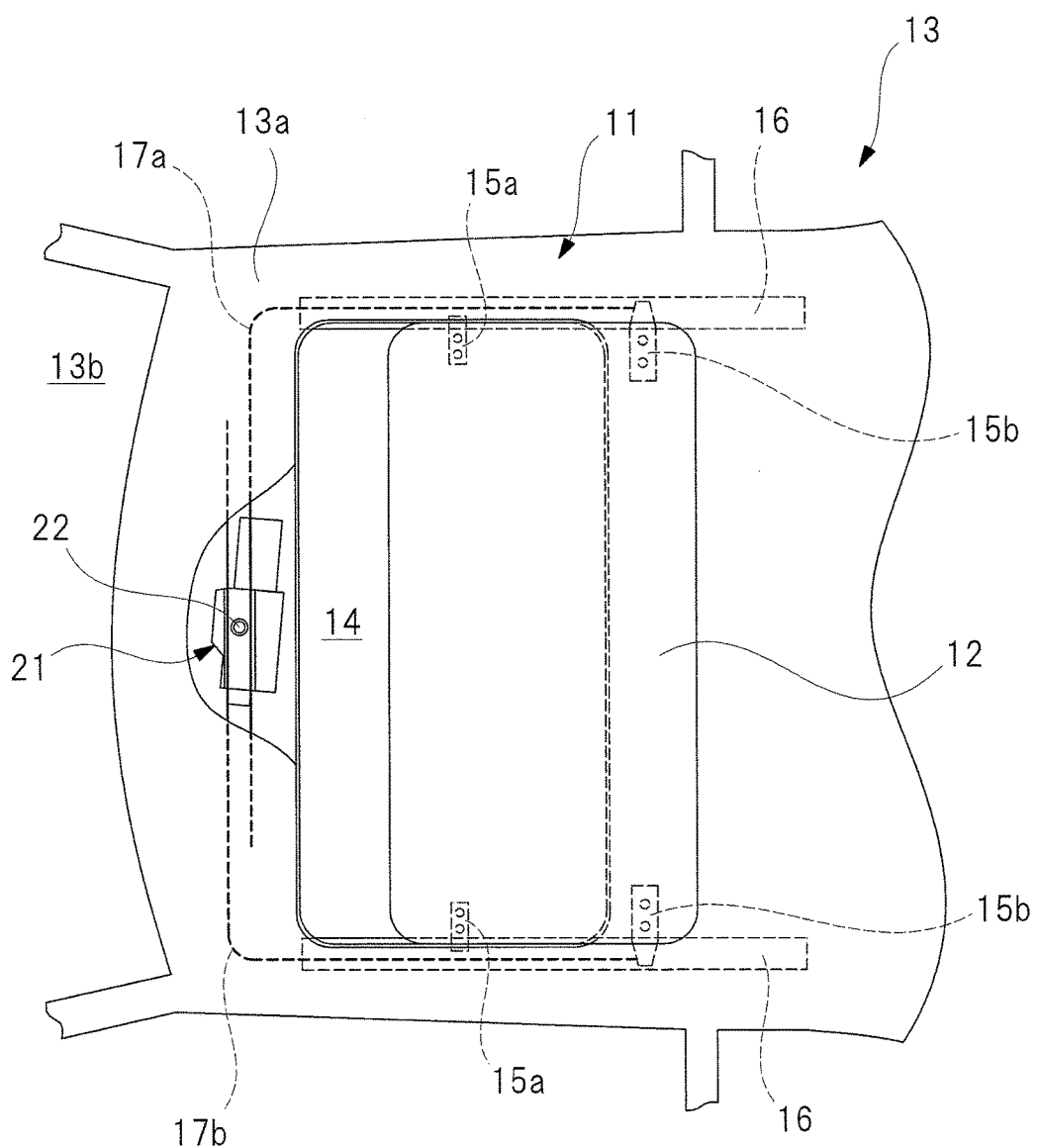
FIG. 1 is an explanatory diagram schematically showing a sunroof apparatus provided to a roof of a vehicle.
Figure 2:
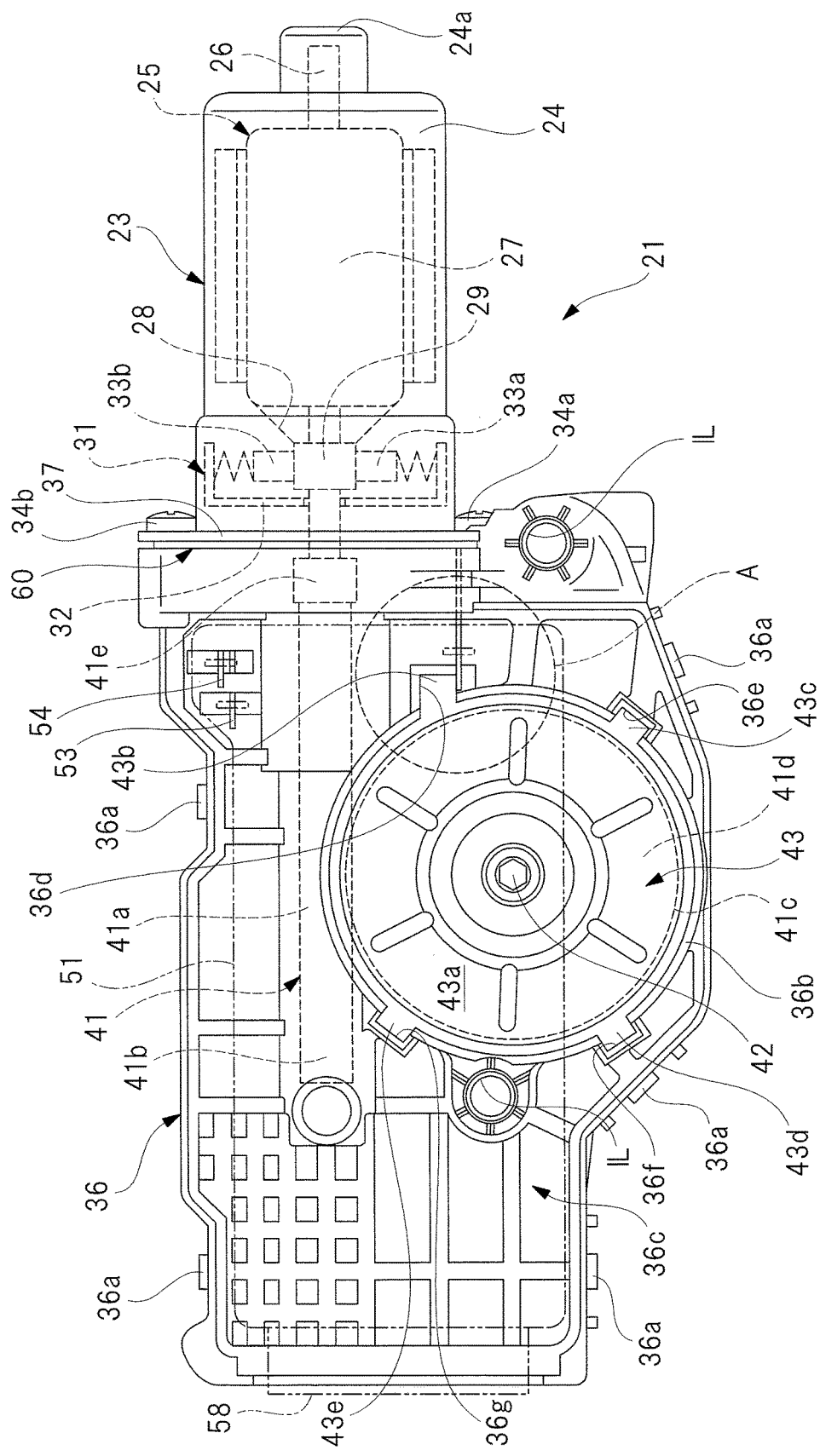
FIG. 2 is a plan view showing details of the sunroof motor of FIG. 1.
Figure 3:
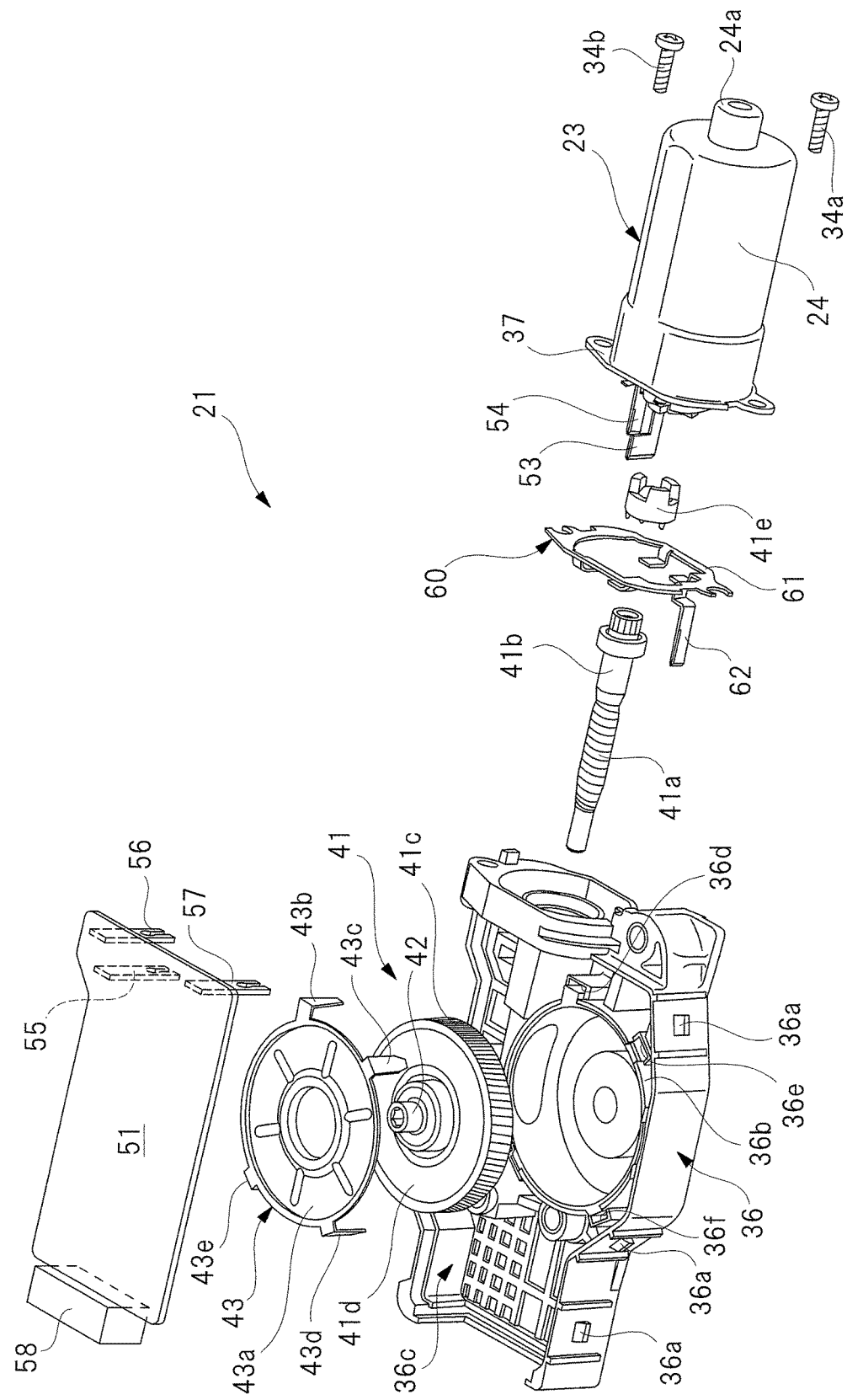
FIG. 3 is an exploded perspective view of the sunroof motor of FIG. 2.
Figure 4:
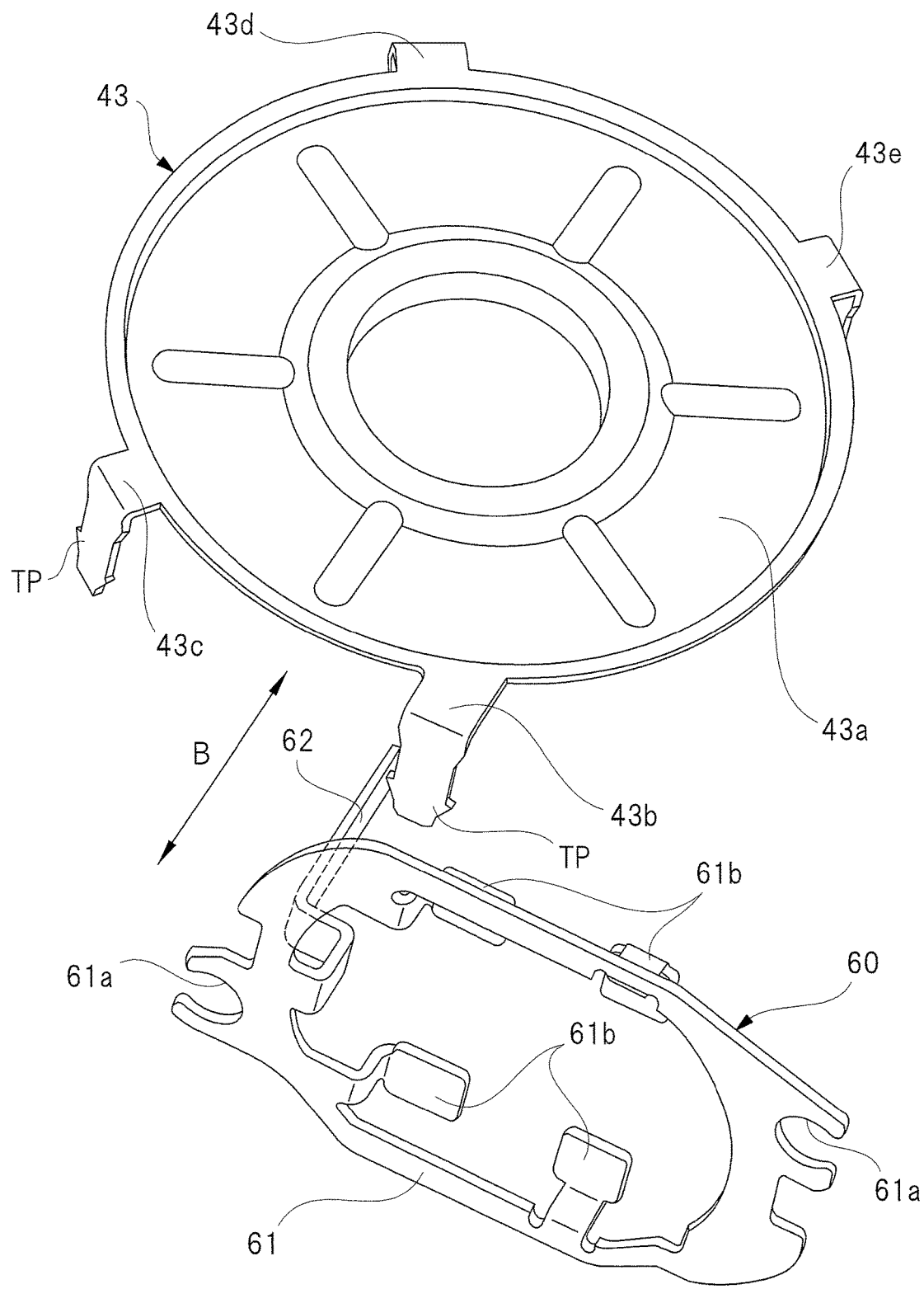
FIG. 4 is a perspective view explaining the connection between a gear cover and a contact plate.
Figure 5:
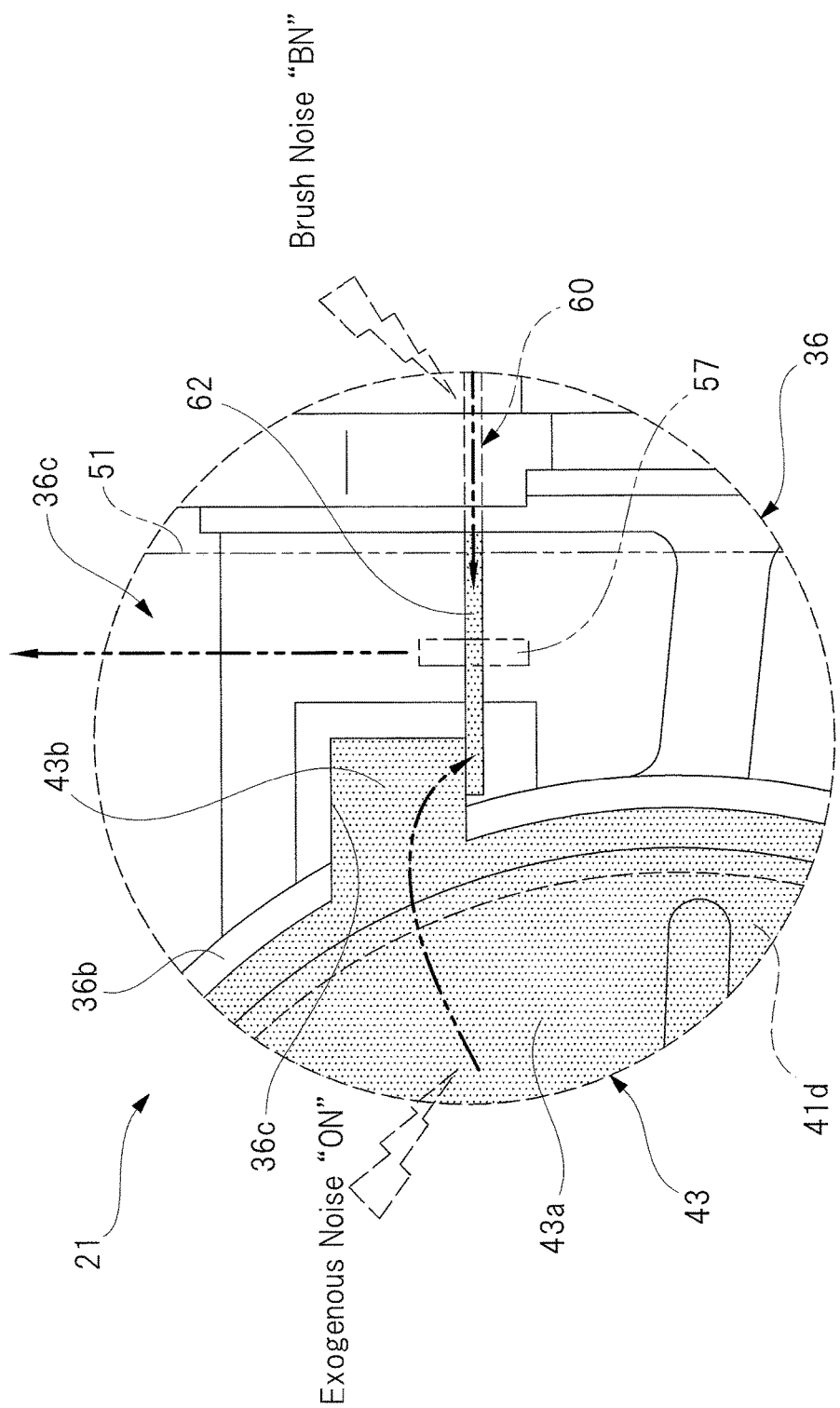
FIG. 5 is an enlarged view showing a portion "A" surrounded by a circle shown in FIG. 2.

FIG. 1 is an explanatory diagram schematically showing a sunroof apparatus provided to a roof of a vehicle, FIG. 2 is a plan view showing details of the sunroof motor of FIG. 1, FIG. 3 is an exploded perspective view of the sunroof motor of FIG. 2, FIG. 4 is a perspective view explaining the connection between a gear cover and a contact plate, and FIG. 5 is an enlarged view showing a portion "A" surrounded by a circle shown in FIG. 2.

As shown in FIG. 1, a sunroof apparatus 11 includes a roof panel (sunroof) 12, by which an opening 14 formed on a roof 13a of a vehicle 13 is opened and closed.

A pair of shoes 15a and 15b and another pair of shoes 15a and 15b are fixed on respective sides of the roof panel 12, and two guide rails 16 each extending in the longitudinal direction of the vehicle are fixed on respective sides of the opening 14 of the roof 13a. The pairs of shoes 15a and 15b are guided by the respective guide rails 16. Therefore, the roof panel 12 is freely movable, that is, openable and closable in the longitudinal direction of the vehicle.

One ends of drive cables 17a and 17b each provided with a gear are respectively connected to the rear-side shoes 15b, while the other ends of the drive cables 17a and 17b are disposed on the vehicle front side of the opening 14.

A sunroof motor 21, which is an electric motor, is disposed on the inner side of the roof 13a and between a front windshield 13b and the opening 14, and closer to the vehicle's front than the opening 14. Each of the drive cables 17a and 17b is engaged with a driving gear 22 disposed on the sunroof motor 21, and when the sunroof motor 21 is operated, the drive cables 17a and 17b are driven in respective directions opposite to each other. As a result, the roof panel 12 is pushed and pulled by the drive cables 17a and 17b so as to open and close the opening 14.

As shown in FIGS. 2 and 3, the sunroof motor 21 has a motor body 23 which is a motor with brush. A yoke 24 making up the motor body 23 is made from a steel plate by press working, etc., into a bottomed cylindrical shape which is almost elliptical in cross-section. An armature 25 is rotatably housed in the yoke 24 and rotatable.

An armature spindle (rotating shaft) 26 extends so as to penetrate the rotation center of the armature 25, and is fixed to the armature 25. The armature spindle 26 is rotatably housed in the yoke 24. One end of the armature spindle 26 is rotatably supported by a bearing (not shown) disposed on the bottom part 24a of the yoke 24.

An armature core 27 wound with multiple armature coils 28 is fixed to the armature spindle 26. Furthermore, a commutator 29 adjacent to the armature core 27 is fixed to the armature spindle 26, and each end of the armature coils 28 is connected to the commutator 29.

A brush device 31 for supplying electric power to the armature 25, that is, the armature coils 28 is attached to an open end of the yoke 24. In the brush device 31, a brush holder 32 is provided with multiple brushes 33a and 33b (only two brushes are shown in FIG. 2) which are movable. Each of the brushes 33a and 33b comes in slide contact with the outer periphery of the commutator 29. A drive current commuted at given timing via the brushes 33a and 33b and the commutator 29 is supplied to the armature coils 28.

A gear case 36 serving as a casing is connected to the open end of the yoke 24 via a pair of fastening screws 34a and 34b. The gear case 36 is made of resin material and formed into a shape similar to a bath tub. A case cover (not shown) is attached to the gear case 36 via five locking claws 36a. In this manner, an open part of the gear case 36 is closed with the case cover to prevent rainwater, dust, etc. from entering the gear case 36.

The open end of the yoke 24 is integrally formed with a flange 37 which projects outward in the radial direction of the open end. The fastening screws 34a and 34b extend so as to penetrate the flange 37, The gear case 36 is provided with a pair of female screw parts (not shown) which are engaged with the respective fastening screws 34a and 34b.

A speed reduction mechanism 41 is rotatably housed in the gear case 36. The speed reduction mechanism 41 is composed of: a worm spindle 41b having an outer periphery formed with a worm 41a; and a worm wheel 41d having an outer periphery formed with gear teeth 41c which is engaged with the worm 41a.

The other end of the armature spindle 26 is connected to one end of the worm spindle 41b via a connecting member 41e so that the worm spindle 41b can rotate integrally with the armature spindle 26. An output spindle 42 is connected to the rotation center of the worm wheel 41d so that the worm wheel 41d can rotate integrally with the output spindle 42. One end of the output spindle 42 extends from the bottom part of the gear case 36 to the outside, and the driving gear 22 (see FIG. 1) is fixed to the extended part of the output spindle 42. In this manner, the rotation of the armature spindle 26 is transmitted to the speed reduction mechanism 41 and is reduced in speed by the speed reduction mechanism 41. Therefore, a torque from the output spindle 42 is transmitted as an enhanced torque via the driving gear 22 to each of the drive cables 17a and 17b.

An almost cylindrical worm wheel housing unit 36b is disposed in the gear case 36. In the present invention, the worm wheel housing unit 36b constitutes a speed reduction mechanism housing unit, the worm wheel 41d making up the speed reduction mechanism 41 is rotatably housed in the worm wheel housing unit 36b.

A board housing unit 36c, in which an almost rectangular control board (circuit board) 51 is housed, is disposed in the gear case 36. The board housing unit 36c is disposed in tandem with the worm wheel housing unit 36b in the axial direction of the output spindle 42 so that the worm wheel housing unit 36b is located closer to the bottom part of the gear case 36, and the board housing unit 36c is located closer to the opening of the gear case 36.

A gear cover (cover member) 43 is attached to an open end of the worm wheel housing unit 36b, that is, on the same side as the worm wheel housing unit 36b in FIG. 2, which is closer to the case cover. The gear cover 43 is provided so as to cover the open end of the worm wheel housing unit 36b, that is, the gear cover 43 is located between the worm wheel 41d housed in the worm wheel housing unit 36b and the control board 51 housed in the board housing unit 36c, thereby preventing lubricating oil (not shown), such as grease, applied to the speed reduction mechanism 41 from leaking out toward the control board 51, etc., in the gear case 36.

The gear cover 43 is made from a metal thin plate (steel plate, etc.) and into an almost disc shape by press working, etc. The gear cover 43 is composed of: a main body 43a; and first, second, third, and fourth fitting claws 43b, 43c, 43d, and 43e formed on the periphery of the main body 43a. As shown in FIG. 4, each base part of the fitting claws 43b to 43e is bent substantially at a right angle, whereby each of the fitting claws 43b to 43e has an almost L-shape in cross-section. On the tip part of each of the fitting claws 43b to 43e, a tapered portion "TP" is formed, which gives each of the fitting claws 43b to 43e a tapered shape.

In the fitting claws 43b to 43e, the first fitting claw 43b is disposed so that its base part faces in the axial direction of the armature spindle 26 (direction of arrow "B" in FIG. 4), thereby allowing the tip part of the first fitting claw 43b to be connected to the tip part of a connection terminal 62 of a contact plate 60, which will be described later. The first, second, third, and fourth fitting claws 43b, 43c, 43d, and 43e are respectively inserted in first, second, third, and fourth fitting holes 36d, 36e, 36f, and 36g formed integrally on the periphery of the worm wheel housing unit 36b of the gear case 36. Just being inserted in this manner, each of the fitting claws 43b to 43e is kept fitted and prevented from coming off. Having tapered portions "TP", the fitting claws 43b to 43e can be fitted easily in the respective fitting holes 36d to 36g.

As shown in FIGS. 2 and 3, the metal contact plate 60 is provided between the yoke 24 and the gear case 36, and held between the yoke 24 and the gear case 36 with the fastening screws 34a and 34b. As shown in FIG. 4, the contact plate 60 has an annular main body 61 which is formed by, for example, press-working from a steel plate made of brass, etc., which has high conductivity into a given shape, and is held between the yoke 24 and the gear case 36, and the connection terminal 62 bent so as to extend in a direction perpendicular to the annular main body 61.

The annular main body 61 is formed with a pair of screw insertion cutouts 61a in which the fastening screws 34a and 34b are respectively inserted after the sunroof motor 21 (see FIG. 2) being assembled. In this manner, the contact plate 60 can be set precisely without any positional shift between the yoke 24 and the gear case 36.

Furthermore, the annular main body 61 has four contact parts 61b, with which four contact parts (not shown) of the brush device 31 come in electrical contact. As a result, brush noise "BN" (see FIG. 5) generated at the brush device 31 is transmitted to the contact plate 60.

The connection terminal 62 is disposed so that its tip part faces in the axial direction of the armature spindle 26 (direction of arrow "B" in FIG. 4) when the sunroof motor 21 is in its assembled state, thereby allowing the connection terminal 62 to be connected to the first fitting claw 43b of the gear cover 43. As shown in FIG. 5, the tip part of the connection terminal 62 is disposed in the first fitting hole 36d of the gear case 36 via a terminal insertion hole (not shown) formed in the gear case 36.

In FIG. 5, the metal gear cover 43 and the metal contact plate 60 are shaded by half-tone dot meshing so as to facilitate the recognition of both the gear cover 43 and the metal contact plate 60.

As shown in FIGS. 2 and 3, the control board 51 housed in the board housing unit 36c is adapted to control the rotation of the armature spindle 26 making up the motor main body 23. The control board 51 is mounted with a control circuit (not shown) for controlling a drive current to be supplied to the armature coil 28, that is, electric power supplied to the brushes 33a and 33b. The control circuit includes a rotation sensor (not shown), etc., which detects the rotation of the armature spindle 26.

The brush device 31 is provided with a pair of power terminals 53 and 54 (see FIG. 2), and the control board 51 is provided with a pair of connection pieces 55 and 56 (see FIG. 5). By housing and fixing the control board 51 in the board housing unit 36c, the connection pieces 55 and 56 are connected to the respective power terminals 53 and 54, and the control board 51 is electrically connected to the brushes 33a and 33b.

Each of the power terminals 53 and 54 of the brush device 31 is formed into a sheet, and disposed so that its long side faces in the axial direction of the armature spindle 26, and its short side (width direction) faces in a direction perpendicular to the direction of an opening of the gear case 36, thereby connecting the power terminals 53 and 54 to the respective connection pieces 55 and 56, and improving the assembling efficiency of the sunroof motor 21.

When the sunroof motor 21 is in its assembled state, a grounding connection piece 57 (see FIGS. 3 and 5) is provided at an opposite part of control board 51 to the connection terminal 62. The grounding connection piece 57 is the same in shape as the connection pieces 55 and 56. Therefore, the connection terminal 62 is disposed so that its long side faces in the axial direction of the armature spindle 26, and its short side (width direction) faces in a direction perpendicular to the direction of the opening of the gear case 36, thereby connecting the connection terminal 62 to the grounding connection piece 57.

A connector 58, to which an external connector (not shown) is connected, is disposed on one longitudinal side part of control board 51, which is opposite to the grounding connection piece 57. A power supply (not shown) such as battery incorporated in the vehicle 13, and a sunroof switch (not shown), etc. disposed in a vehicle compartment are connected to the connector 58. The grounding connection piece 57 is grounded (earthed) by connection to the body (such as a roof 13a) of the vehicle 13 via the control board 51 and the connector 58. In other words, the gear cover 43 is grounded via the grounding connection piece 57, the control board 51, and the connector 58.

In this manner, the connection terminal 62 of the contact plate 60 is electrically connected to the grounding connection piece 57 of the control board 51. As a result, as indicated by two-dot chain line arrows in FIG. 3, brush noise "BN" coming from the annual body 61 of the contact plate 60 and exogenous noise "ON" transmitted to the metal cover 43 are each transmitted to the grounding connection piece 57. Then, brush noise "BN" and exogenous noise "ON" transmitted to the grounding connection piece 57 are introduced to the roof 13a, etc. (vehicle body) of the vehicle 13 via the control board 51 and the connector 58, as indicated by a two-dot chain line arrow in FIG. 3.

Reference character "IL" indicated in FIG. 2 denotes install legs for fixing the sunroof motor 21 on the inside of the roof 13a (see FIG. 1). The install legs "IL" are disposed opposite to each other across the worm wheel housing unit 36b. Each of the install legs "IL" is fixed on the inside of the roof 13a with a fixing bolt via a metal bush (both bolt and bush are not shown). Via the install legs "IL", exogenous noise "ON", such as static electricity, enters the sunroof motor 21 relatively easily.

Then, when the sunroof switch is operated and flipped by a driver and the like, a drive current is supplied to the control board 51 from the power supply via the connector 58, the control circuit controls the drive current so as to supply a given current to the armature coils 28 via the connection pieces 55 and 56, the power terminals 53 and 54, the brushes 33a and 33b, and the commutator 29.

As describe above, in the sunroof motor 21 according to the above embodiment, the grounded metal gear cover 43 covering the worm wheel housing unit 36b is provided between the worm wheel 41d and the control board 51. In this configuration, even if exogenous noise "ON" such as static electricity enters the sunroof motor 21 and reaches the gear cover 43, exogenous noise "ON" is quickly eliminated and introduced to the outside of the sunroof motor 21. Therefore, exogenous noise "ON" can be surely prevented from being reflected to the control board 51, and causing the control board 51 to malfunction and the like, thereby improving reliability of the sunroof motor 21.

Furthermore, in the sunroof motor 21 according to the above embodiment, the metal contact plate 60 having the connection terminal 62 is provided between the yoke 24 and the gear case 36, and the connection terminal 62 is connected to the gear cover 43. In this configuration, brush noise "BN" from the motor body 23 is quickly introduced to the outside of the sunroof motor 21.

Furthermore, in the sunroof motor 21 according to the above embodiment, the gear cover 43 has the fitting claws 43*b* to 43*e* which are respectively fitted in the fitting holes 36*d* to 36*g* of the gear case 36, and the connection terminal 62 is connected to the first fitting claw 43*b*. In this configuration, the connection terminal 62 is electrically connected easily to the first fitting claw 43*b* by merely inserting the fitting claws 43*b* to 43*e* in the respective fitting holes 36*d* to 36*g*.

The present invention is not limited to the above embodiment, and various modifications and alterations of this invention will become apparent to those skilled in the art without departing from the scope of this invention. For example, in the above embodiment, exogenous noise "ON" and brush noise "BN", which is transmitted to the contact plate 60 via the grounding connection piece 57 and the connector 58 of the control board 51, are eliminated and introduced to the roof 13*a* of the vehicle 13 (i.e., to the grounded conductor). The present invention, however, is not limited to this example. Since what is essential is to introduce various noises transmitted to the contact plate 60 to the body of the vehicle 13, various noises may be introduced to the body of the vehicle 13 via the fastening screws 34*a* and 34*b* brought into contact with the contact plate 60. In this case, it is possible to eliminate noises without using the grounding connection piece 57, simplify the structures of the control board 51 and the connector 58.

In this embodiment, the present invention is applied to the sunroof motor 21 for the sunroof apparatus 11 of the vehicle 13. The present invention, however, may also be applied to, for example, an electric motor for a slide door apparatus, power window apparatus, etc., incorporated in the vehicle.

The electric motor is used as a driving source for a sunroof apparatus, etc., incorporated in a vehicle such as automotive vehicle, and is actuated so as to open and close a roof panel by pushing/pulling drive cables.

While the present invention has been illustrated and described with respect to a particular embodiment thereof, it should be appreciated by those of ordinary skill in the art that various modifications to this invention ma be made without departing from the spirit and scope of the present.

What is claimed is:

1. An electric motor mounted on a vehicle, the electric motor comprising:
    a yoke in which a rotating shaft is housed;
    a casing connected to the yoke;
    a speed reduction mechanism housing unit provided in the casing, wherein a speed reduction mechanism for reducing a rotation speed of the rotating shaft is housed in the speed reduction mechanism housing unit;
    a board housing unit provided in the casing, and a circuit board for controlling a rotation of the rotating shaft;
    a cover member made of metal, and provided between the speed reduction mechanism and the circuit board so as to cover the speed reduction mechanism housing unit; and
    a contact plate made of metal, and held between the yoke and the casing;
    wherein the cover member is grounded to a body of the vehicle via the contact plate.

2. The electric motor according to claim 1, wherein
    the contact plate has a connection terminal extending to the cover member,
    the casing has a fitting hole, and
    the cover member has a fitting claw which is fitted in the fitting hole of the casing, and electrically connected to the connection terminal of the contact plate.

* * * * *